(12) United States Patent
Zuo et al.

(10) Patent No.: US 9,835,901 B2
(45) Date of Patent: Dec. 5, 2017

(54) REFLECTIVE TYPE DISPLAY DEVICE

(71) Applicants: Boe Technology Group Co., Ltd., Beijing (CN); Chengdu Boe Optoelectronics Technology Co., Ltd., Sichuan (CN)

(72) Inventors: Xiongcan Zuo, Beijing (CN); Junrui Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 95 days.

(21) Appl. No.: 14/785,587

(22) PCT Filed: Apr. 27, 2015

(86) PCT No.: PCT/CN2015/077482
§ 371 (c)(1),
(2) Date: Oct. 19, 2015

(87) PCT Pub. No.: WO2016/045379
PCT Pub. Date: Mar. 31, 2016

(65) Prior Publication Data
US 2016/0291406 A1 Oct. 6, 2016

(30) Foreign Application Priority Data
Sep. 23, 2014 (CN) .......................... 2014 1 0491877

(51) Int. Cl.
*G02F 1/1335* (2006.01)
*G02F 1/13363* (2006.01)
(Continued)

(52) U.S. Cl.
CPC ...... *G02F 1/133555* (2013.01); *G02F 1/1368* (2013.01); *G02F 1/133345* (2013.01);
(Continued)

(58) Field of Classification Search
CPC ......... G02F 1/133553; G02F 2203/055; G02F 1/133528; G02F 2001/133541;
(Continued)

(56) References Cited

U.S. PATENT DOCUMENTS 5,555,114 A * 9/1996 Narita ............... G02F 1/133514
349/97
9,063,353 B2 * 6/2015 Hashimura ........... G02F 1/0018
(Continued)

FOREIGN PATENT DOCUMENTS

CN 1391130 1/2003
CN 1482501 3/2004
(Continued)

OTHER PUBLICATIONS

International Search Report and Written Opinion from PCT/CN15/077482 dated Jul. 22, 2015.
(Continued)

*Primary Examiner* — Jia Pan
(74) *Attorney, Agent, or Firm* — Calfee, Halter & Griswold LLP

(57) ABSTRACT

An embodiment of the present invention discloses a reflective type display device, relating to the technical field of display. The liquid crystal display device is relatively thin and light, with low energy consumption. The reflective type display device comprises a polarizer, a transparent first substrate, a liquid crystal molecular layer and a second substrate arranged in sequence; wherein the reflective type display device further comprises: a selective reflecting layer located between the liquid crystal molecular layer and the
(Continued)

second substrate; the selective reflecting layer reflects light with wavelength within a specific wavelength range.

12 Claims, 4 Drawing Sheets

(51) Int. Cl.
 *G02F 1/1333* (2006.01)
 *G02F 1/1362* (2006.01)
 *G02F 1/1368* (2006.01)
(52) U.S. Cl.
 CPC .. *G02F 1/133553* (2013.01); *G02F 1/136227* (2013.01); *G02F 1/13363* (2013.01); *G02F 1/133528* (2013.01); *G02F 2001/133541* (2013.01); *G02F 2001/133638* (2013.01); *G02F 2201/121* (2013.01); *G02F 2201/123* (2013.01); *G02F 2203/055* (2013.01); *G02F 2203/09* (2013.01); *G02F 2413/01* (2013.01); *G02F 2413/05* (2013.01)
(58) Field of Classification Search
 CPC ..... G02F 2001/133638; G02F 1/13363; G02F 1/133555; G02F 1/133345; G02F 1/1368; G02F 1/136227
 See application file for complete search history.

(56) References Cited

U.S. PATENT DOCUMENTS

| | | | | |
|---|---|---|---|---|
| 2002/0113765 | A1* | 8/2002 | Moon | G02F 1/133514 345/88 |
| 2002/0135719 | A1* | 9/2002 | Moon | G02B 5/201 349/115 |
| 2003/0001994 | A1* | 1/2003 | Iino | G02F 1/133555 349/113 |
| 2004/0032556 | A1* | 2/2004 | Yoon | G02F 1/133514 349/115 |
| 2012/0249940 | A1* | 10/2012 | Choi | G02F 1/133753 349/123 |

FOREIGN PATENT DOCUMENTS

| | | |
|---|---|---|
| CN | 102654680 | 9/2012 |
| CN | 203385963 | 1/2014 |
| CN | 104267528 | 1/2015 |
| JP | 2000231097 | 8/2000 |

OTHER PUBLICATIONS

Office action from Chinese Application No. 201410491877.5 dated Jul. 1, 2016.

* cited by examiner

REFLECTIVE TYPE DISPLAY DEVICE

RELATED APPLICATIONS

The present application is the U.S. national phase entry of PCT/CN2015/077482, with an international filing date of Apr. 27, 2015, which claims the benefit of Chinese Patent Application No. 201410491877.5, filed Sep. 23, 2014, the entire disclosures of which are incorporated herein by reference.

FIELD OF THE INVENTION

The present invention relates to the technical field of display, in particular to a reflective type display device.

BACKGROUND OF THE INVENTION

Liquid crystal display device is a commonly used display device; a liquid crystal display device usually comprises a backlight module, a lower polarizer, a display panel and an upper polarizer, etc.; the display panel comprises an array substrate, a color film substrate and a liquid crystal molecular layer between the array substrate and the color film substrate.

In particular, in the display process of the liquid crystal display device, the backlight module provides light for the display panel, and the display panel displays images. Specifically, the light emitted by the backlight module passes through the lower polarizer, the array substrate, the liquid crystal molecular layer, the color film substrate and the upper polarizer in sequence, then arrives human eyes.

The inventor has realized that during the display process of the liquid crystal display device in the prior art, a backlight module should be used to provide light for the display panel, making the liquid crystal display device relatively thick and heavy, with high energy consumption.

SUMMARY OF THE INVENTION

A technical problem to be solved by the present invention is to provide a reflective type display device, which is relatively thin and light, with low energy consumption.

To solve the above mentioned technical problem, an embodiment of the present invention provides a reflective type display device, applying the following solution.

A reflective type display device, wherein the reflective type display device comprises a polarizer, a transparent first substrate, a liquid crystal molecular layer and a second substrate arranged in sequence; wherein the reflective type display device further comprises: a selective reflecting layer located between the liquid crystal molecular layer and the second substrate; the selective reflecting layer reflects light with wavelength within a specific wavelength range.

Preferably, the selective reflecting layer comprises a first portion, a second portion and a third portion; the first portion reflects light with wavelength within red wavelength range; the second portion reflects light with wavelength within green wavelength range; and the third portion reflects light with wavelength within blue wavelength range.

Preferably, wherein the first portion, the second portion and the third portion transmit light with wavelength within a wavelength range not reflected; the first portion, the second portion and the third portion are electrically conductive.

Preferably, a material for the first portion is silver nanoparticle coated with silver coating; a material for the second portion is titanium dioxide nanoparticle coated with silver coating; a material for the third portion is silicon nanoparticle coated with silver coating.

Preferably, the reflective type display device further comprises a quarter-wave plate located between the polarizer and the first substrate; the selective reflecting layer is located on the second substrate; an insulating layer, a thin film transistor, a passivation layer and a pixel electrode are arranged on the selective reflecting layer in sequence; the pixel electrode is connected with a drain of the thin film transistor through a via hole on the passivation layer.

Preferably, the reflective type display device further comprises a quarter-wave plate located between the polarizer and the first substrate; the selective reflecting layer is located on the second substrate; a thin film transistor and a passivation layer are arranged on the second substrate; the selective reflecting layer is located on the passivation layer; the selective reflecting layer is connected with a drain of the thin film transistor through a via hole on the passivation layer.

Preferably, the selective reflecting layer is located on the second substrate; an insulating layer is arranged on the selective reflecting layer; a thin film transistor, a common electrode, a passivation layer and a pixel electrode are arranged on the insulating layer; the pixel electrode is connected with a drain of the thin film transistor through a via hole on the passivation layer; the common electrode and/or the pixel electrode has slits.

Preferably, a common electrode, a thin film transistor and a passivation layer are arranged on the second substrate; the selective reflecting layer is located on the passivation layer; the selective reflecting layer is connected with a drain of the thin film transistor through a via hole on the passivation layer; the selective reflecting layer and/or the common electrode has slits.

Preferably, a thin film transistor, a passivation layer and a pixel electrode are arranged on the second substrate; the pixel electrode is connected with a drain of the thin film transistor through a via hole on the passivation layer; the selective reflecting layer and/or the pixel electrode has slits.

Preferably, a black matrix with grid shape is arranged on a surface of the first substrate close to the liquid crystal molecular layer; the black matrix covers positions where the first portion, the second portion and the third portion neighbor each other.

Preferably, the second substrate is transparent or opaque; if the second substrate is transparent, an absorption layer is arranged on a surface of the second substrate apart from the liquid crystal molecular layer, absorbing light penetrating the selective reflecting layer and the second substrate.

The embodiments of the present invention provide a reflective type display device, wherein the reflective type display device comprises a polarizer, a transparent first substrate, a liquid crystal molecular layer and a second substrate arranged in sequence; wherein the reflective type display device further comprises: a selective reflecting layer located between the liquid crystal molecular layer and the second substrate; the selective reflecting layer reflects light with wavelength within a specific wavelength range. Ambient light passes through the polarizer, the first substrate, the liquid crystal molecular layer in sequence and shines on the selective reflecting layer; the selective reflecting layer reflects light with wavelength within a specific wavelength range; the reflected light passes through the liquid crystal molecular layer, the first substrate and the polarizer in sequence and exits, thereby realizing color display. Compared with the prior art, during display process, the reflective type display device provided by the embodiments of the present invention requires neither backlight module for providing light, nor color film substrate or a second polarizer; therefore, the liquid crystal display device is relatively thin and light, with low energy consumption.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

REFERENCE SIGNS

1—polarizer
2—first substrate
3—liquid crystal molecular layer
4—second substrate
5—selective reflecting layer
51—first portion
52—second portion
53—third portion
6—absorption layer
7—black matrix
8—insulating layer
9—thin film transistor
10—passivation layer
11—pixel electrode
12—common electrode
13—quarter-wave plate.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

To solve the above mentioned technical problem, an embodiment of the present invention provides a reflective type display device, which is relatively thin and light, with low energy consumption.

Figure 1:
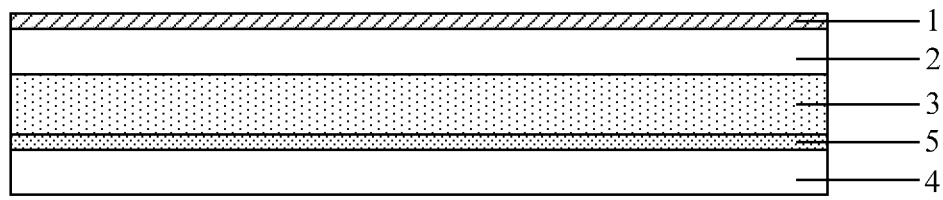
FIG. 1 is a first schematic diagram of the reflective type display device according to an embodiment of the present invention.

In particular, as shown in FIG. 1, the reflective type display device comprises a polarizer 1, a transparent first substrate 2, a liquid crystal molecular layer 3 and a second substrate 4 arranged in sequence; wherein the reflective type display device further comprises: a selective reflecting layer 5 located between the liquid crystal molecular layer 3 and the second substrate 4; the selective reflecting layer 5 reflects light with wavelength within a specific wavelength range.

Figure 2:
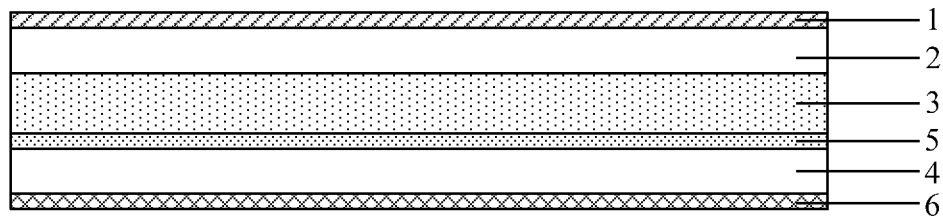
FIG. 2 is a second schematic diagram of the reflective type display device according to an embodiment of the present invention.

It should be noted that, in the embodiments of the present invention, the second substrate 4 can be transparent or opaque; if the second substrate 4 is transparent, as shown in FIG. 2, an absorption layer 6 is arranged on a surface of the second substrate 4 apart from the liquid crystal molecular layer 3, absorbing light penetrating the selective reflecting layer 5 and the second substrate 4.

The embodiments of the present invention provide a reflective type display device, wherein the reflective type display device comprises a polarizer, a transparent first substrate, a liquid crystal molecular layer and a second substrate arranged in sequence; wherein the reflective type display device further comprises: a selective reflecting layer located between the liquid crystal molecular layer and the second substrate; the selective reflecting layer reflects light with wavelength within a specific wavelength range. Ambient light passes through the polarizer, the first substrate, the liquid crystal molecular layer in sequence and shines on the selective reflecting layer; the selective reflecting layer reflects light with wavelength within a specific wavelength range; the reflected light passes through the liquid crystal molecular layer, the first substrate and the polarizer in sequence and exits, thereby realizing color display. Compared with the prior art, during display process, the reflective type display device provided by the embodiments of the present invention requires neither backlight module for providing light, nor color film substrate or a second polarizer; therefore, the liquid crystal display device is relatively thin and light, with low energy consumption.

In addition, since the selective reflecting layer 5 can reflect light with wavelength within a specific wavelength range, the reflective type display device in the embodiment of the present invention can realize color display without color filter layer, avoiding the loss of light caused during passing through the color filter layer, and improving the utilization of light.

Figure 3:
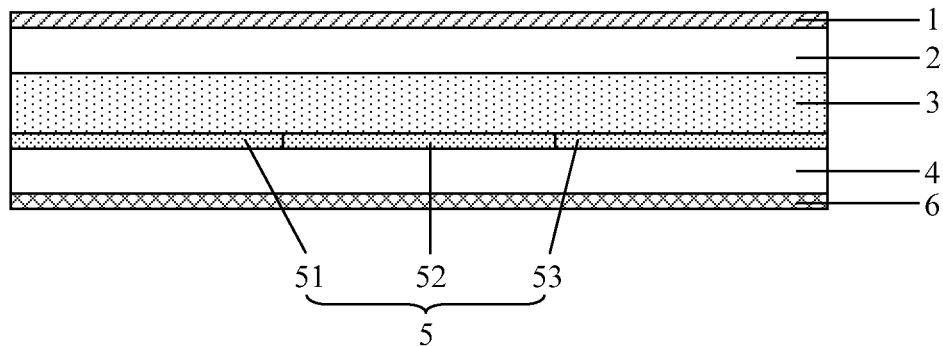
FIG. 3 is a third schematic diagram of the reflective type display device according to an embodiment of the present invention.

Further, if the entire selective reflecting layer 5 only reflects light with one specific wavelength, the reflective type display device can display one color only; if the selective reflecting layer comprises a plurality of portions for reflecting light with different wavelengths, the reflective type display device can realize color display. As shown in FIG. 3, in an embodiment of the present invention, it is preferred that the selective reflecting layer 5 comprises a first portion 51, a second portion 52 and a third portion 53; wherein the first portion 51 reflects light with wavelength within red wavelength range (622~760 nm); the second portion 52 reflects light with wavelength within green wavelength range (492~577 nm); and the third portion 53 reflects light with wavelength within blue wavelength range (435~450 nm).

Further, the first portion 51, the second portion 52 and the third portion 53 can transmit light with wavelength within a wavelength range not reflected; the first portion 51, the second portion 52 and the third portion 53 are electrically conductive. For example, a material for the first portion 51 is silver nanoparticle coated with silver coating; a material for the second portion 52 is titanium dioxide nanoparticle coated with silver coating; a material for the third portion 53 is silicon nanoparticle coated with silver coating. When light shines on the interface between the nanoparticle and the silver coating of the first portion 51, the second portion 52 or the third portion 53, surface plasmon resonance (SPR) occurs, such that light with wavelength within a specific wavelength range can be reflected, and other light can penetrate. In such a situation, the selective reflecting layer is transparent and electrically conductive. In particular, a silver nanoparticle coated with silver coating can reflect light with wavelength within red wavelength range; a titanium dioxide nanoparticle coated with silver coating can reflect light with wavelength within green wavelength range; a silicon nanoparticle coated with silver coating can reflect light with wavelength within blue wavelength range. Furthermore, any one of these portions can comprises nanoparticles with different sizes, such that one portion can reflect light with different wavelengths within a specific wavelength range.

Figure 4:
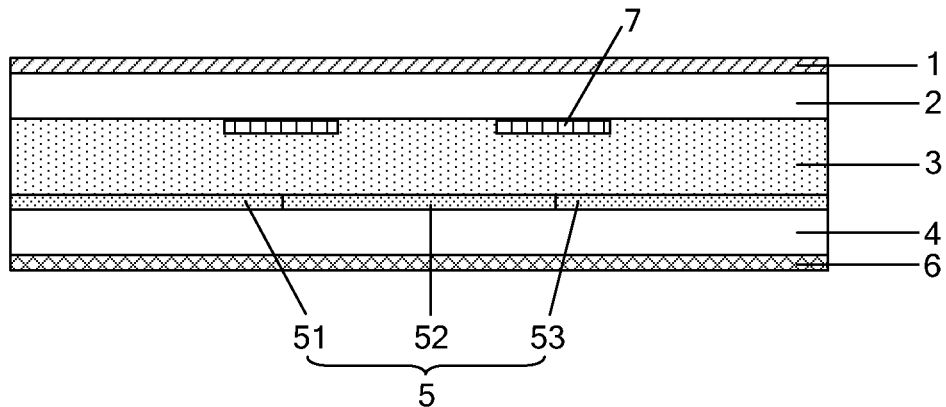
FIG. 4 is a fourth schematic diagram of the reflective type display device according to an embodiment of the present invention.

In addition, when the selective reflecting layer comprises a first portion 51, a second portion 52 and a third portion 53, in order to avoid cross color at positions where the first portion, the second portion and the third portion neighbor each other, as shown in FIG. 4, it is preferred that a black matrix 7 with grid shape is arranged on a surface of the first substrate 2 close to the liquid crystal molecular layer 3; the black matrix 7 covers positions where the first portion, the second portion and the third portion neighbor each other.

A reflective type display device comprising the above-mentioned structures can operate in display modes such as TN, ECB, ADS, VA, IPS, FFS and so on.

In order to facilitate the understanding for those skilled in the art, the embodiments of the invention provide several possible specific structures of the reflective type display device.

Figure 5:
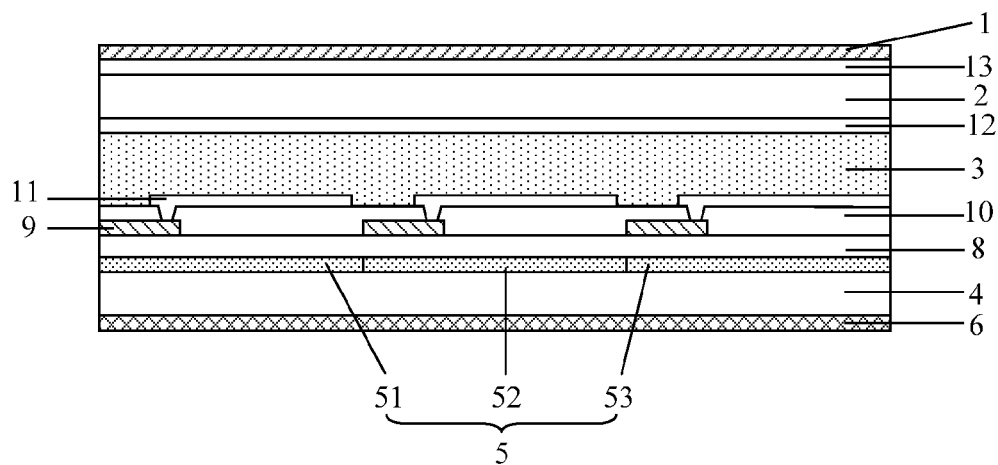
FIG. 5 is a fifth schematic diagram of the reflective type display device according to an embodiment of the present invention.

The first one, as shown in FIG. 5, the reflective type display device further comprises a quarter-wave plate 13 located between the polarizer 1 and the first substrate 2; further, the selective reflecting layer 5 is located on the second substrate 4; an insulating layer 8, a thin film transistor 9, a passivation layer 10 and a pixel electrode 11 are arranged on the selective reflecting layer 5 in sequence; wherein the pixel electrode 11 is connected with a drain of the thin film transistor 9 through a via hole on the passivation layer 10; a common electrode 12 is arranged on a surface on the first substrate 2 close to the liquid crystal molecular layer 3.

Figure 6:
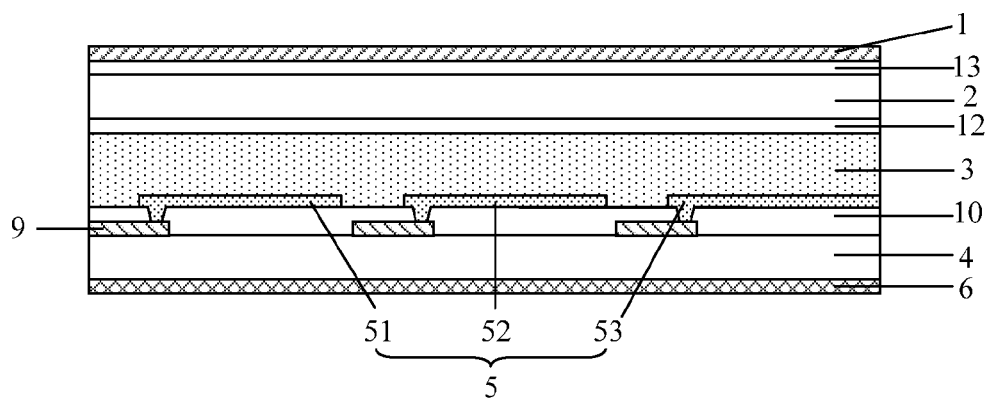
FIG. 6 is a sixth schematic diagram of the reflective type display device according to an embodiment of the present invention.

The second one, in the selective reflecting layer 5, the material for the first portion 51 is silver nanoparticle coated with silver coating; the material for the second portion 52 is titanium dioxide nanoparticle coated with silver coating; the material for the third portion 53 is silicon nanoparticle coated with silver coating; the selective reflecting layer 5 then is transparent and electrically conductive, thus the selective reflecting layer 5 can also serve as a pixel electrode. In such a situation, as shown in FIG. 6, the reflective type display device further comprises a quarter-wave plate 13 located between the polarizer 1 and the first substrate 2; a thin film transistor 9 and a passivation layer 10 are arranged on the second substrate 4; the selective reflecting layer 5 is located on the passivation layer 10; the selective reflecting layer 5 is connected with a drain of the thin film transistor 9 through a via hole on the passivation layer 10; a common electrode 12 is arranged on a surface on the first substrate 2 close to the liquid crystal molecular layer 3.

In a reflective type display device with the first structure or the second structure, when the liquid crystal molecules in the liquid crystal molecular layer 3 are twisted nematic (i.e., the long axis direction of the liquid crystal molecules close to the first substrate 2 is arranged parallel to the transmission axis direction of the polarizer 1; the long axis direction of the liquid crystal molecules close to the second substrate 4 is arranged perpendicular to the transmission axis direction of the polarizer 1), the reflective type display device with the first structure or the second structure operates in TN display mode.

Figure 7:
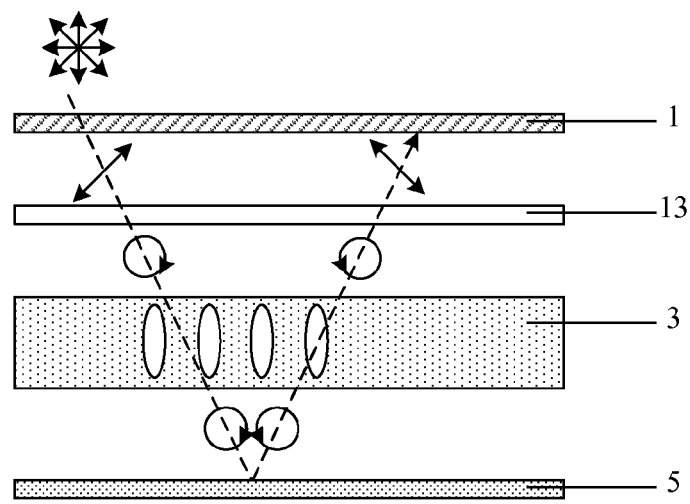
FIG. 7 is a first schematic diagram showing the display principle of the reflective type display device of TN display mode according to an embodiment of the present invention.

For example, as shown in FIG. 7, when an electric field exists between the pixel electrode 11 and the common electrode 12, the long axis direction of the liquid crystal molecules in the liquid crystal molecular layer 3 is arranged parallel to the direction of the electric field. In such a situation, after passes through the polarizer 1 (in FIG. 7, the transmission axis direction of the polarizer 1 is 45°; a slow axis direction of the quarter-wave plate 13 is 0°), ambient light is converted into linearly polarized light with a polarization direction parallel to the transmission axis direction of the polarizer 1; this linearly polarized light is converted into right-hand circularly polarized light after passes through the quarter-wave plate 13; the polarization state of this right-hand circularly polarized light is not changed after this right-hand circularly polarized light passes through the liquid crystal molecular layer 3; when this right-hand circularly polarized light shines on the selective reflecting layer 5, the selective reflecting layer 5 reflects light with wavelength within a specific wavelength range therein; since the propagation direction of the reflected light is changed, this part of light is converted into left-hand circularly polarized light; the polarization state of this left-hand circularly polarized light is not changed after this left-hand circularly polarized light passes through the liquid crystal molecular layer 3; this left-hand circularly polarized light is converted into linearly polarized light after passes through the quarter-wave plate 13; now the polarization direction of this linearly polarized light is perpendicular to the transmission axis direction of the polarizer 1, therefore this linearly polarized light can not pass through the polarizer 1, the reflective type display device thus displays black.

Figure 8:
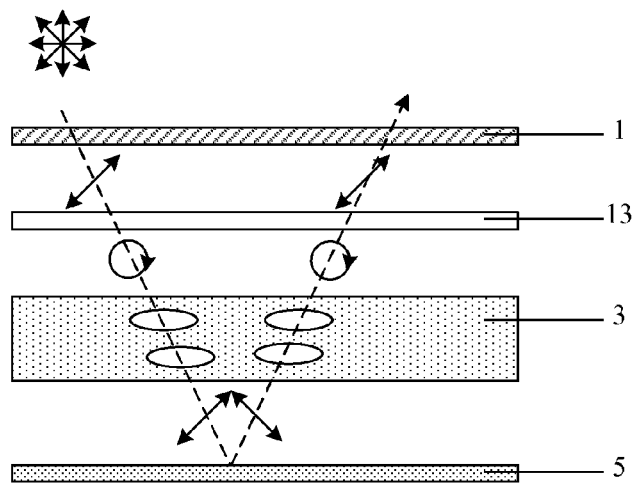
FIG. 8 is a second schematic diagram showing the display principle of the reflective type display device of TN display mode according to an embodiment of the present invention.

As shown in FIG. 8, when no electric field exists between the pixel electrode 11 and the common electrode 12, the liquid crystal molecules in the liquid crystal molecular layer 3 are twisted nematic; the regulating effect of the liquid crystal molecular layer 3 for light is equivalent to a quarter-wave plate with a slow axis direction being 0°. In such a situation, after passes through the polarizer 1 (in FIG. 8, the transmission axis direction of the polarizer 1 is 45°; a slow axis direction of the quarter-wave plate 13 is 0°), ambient light is converted into linearly polarized light with a polarization direction parallel to the transmission axis direction of the polarizer 1; this linearly polarized light is converted into right-hand circularly polarized light after passes through the quarter-wave plate 13; this right-hand circularly polarized light is converted into linearly polarized light with a polarization direction parallel to the transmission axis direction of the polarizer 1 after this right-hand circularly polarized light passes through the liquid crystal molecular layer 3; when this linearly polarized light shines on the selective reflecting layer 5, the selective reflecting layer 5 reflects light with wavelength within a specific wavelength range therein; the reflected light is linearly polarized light with a polarization direction perpendicular to the transmission axis direction of the polarizer 1; this linearly polarized light is converted into right-hand circularly polarized light after passes through the liquid crystal molecular layer 3; this right-hand circularly polarized light is converted into linearly polarized light with a polarization direction parallel to the transmission axis direction of the polarizer 1 after passes through the quarter-wave plate 13; this linearly polarized light can pass through the polarizer 1, the reflective type display device thus realizes color display.

In a reflective type display device with the first structure or the second structure, when initial orientations of all the liquid crystal molecules in the liquid crystal molecular layer 3 are the same, and long axis of all the liquid crystal molecules is angled 45° with respect to the transmission axis direction of the polarizer 1, the reflective type display device with the first structure or the second structure operates in ECB display mode.

Figure 9:
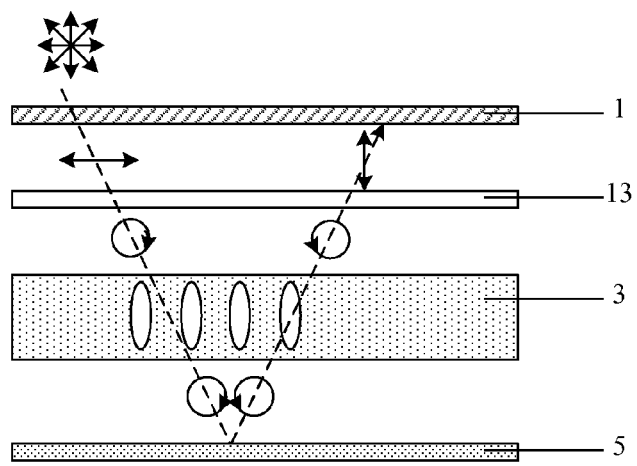
FIG. 9 is a first schematic diagram showing the display principle of the reflective type display device of ECB display mode according to an embodiment of the present invention.

For example, as shown in FIG. 9, when an electric field exists between the pixel electrode 11 and the common electrode 12, the long axis direction of the liquid crystal molecules in the liquid crystal molecular layer 3 is arranged parallel to the direction of the electric field. In such a situation, after passes through the polarizer 1 (in FIG. 9, the transmission axis direction of the polarizer 1 is 0°; a slow axis direction of the quarter-wave plate 13 is 135°), ambient light is converted into linearly polarized light with a polarization direction parallel to the transmission axis direction of the polarizer 1; this linearly polarized light is converted into right-hand circularly polarized light after passes through the quarter-wave plate 13; the polarization state of this right-hand circularly polarized light is not changed after this right-hand circularly polarized light passes through the liquid crystal molecular layer 3; when this right-hand circularly polarized light shines on the selective reflecting layer 5, the selective reflecting layer 5 reflects light with wavelength within a specific wavelength range therein; since the propagation direction of the reflected light is changed, this part of light is converted into left-hand circularly polarized light; the polarization state of this left-hand circularly polarized light is not changed after this left-hand circularly polarized light passes through the liquid crystal molecular layer 3; this left-hand circularly polarized light is converted into linearly polarized light after passes through the quarter-wave plate 13; now the polarization direction of this linearly polarized light is perpendicular to the transmission axis direction of the polarizer 1, therefore this linearly polarized light can not pass through the polarizer 1, the reflective type display device thus displays black.

Figure 10:
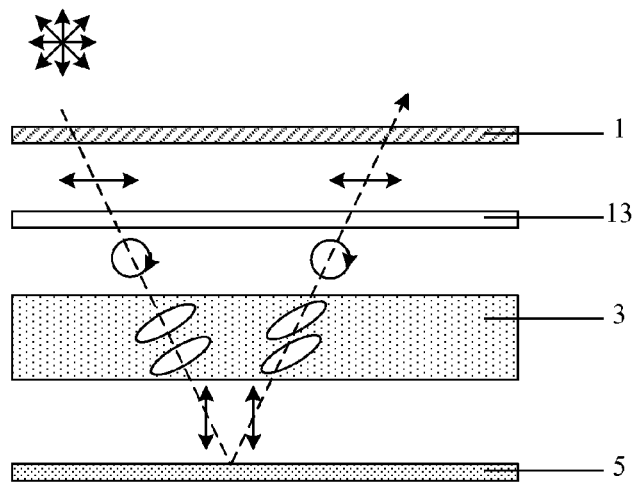
FIG. 10 is a second schematic diagram showing the display principle of the reflective type display device of ECB display mode according to an embodiment of the present invention.

As shown in FIG. 10, when no electric field exists between the pixel electrode 11 and the common electrode 12, the long axis direction of the liquid crystal molecules in the liquid crystal molecular layer 3 is angled 45° with respect to transmission axis direction of the polarizer 1; the regulating effect of the liquid crystal molecular layer 3 for light is equivalent to a quarter-wave plate with a slow axis direction being 135°. In such a situation, after passes through the polarizer 1 (in FIG. 10, the transmission axis direction of the polarizer 1 is 0°; a slow axis direction of the quarter-wave plate 13 is 135°), ambient light is converted into linearly polarized light with a polarization direction parallel to the transmission axis direction of the polarizer 1; this linearly polarized light is converted into right-hand circularly polarized light after passes through the quarter-wave plate 13; this right-hand circularly polarized light is converted into linearly polarized light with a polarization direction perpendicular to the transmission axis direction of the polarizer 1 after this right-hand circularly polarized light passes through the liquid crystal molecular layer 3; when this linearly polarized light shines on the selective reflecting layer 5, the selective reflecting layer 5 reflects light with wavelength within a specific wavelength range therein; the reflected light is linearly polarized light with a polarization direction perpendicular to the transmission axis direction of the polarizer 1; this linearly polarized light is converted into right-hand circularly polarized light after passes through the liquid crystal molecular layer 3; this right-hand circularly polarized light is converted into linearly polarized light with a polarization direction parallel to the transmission axis direction of the polarizer 1 after passes through the quarter-wave plate 13; this linearly polarized light can pass through the polarizer 1, the reflective type display device thus realizes color display.

Figure 11:
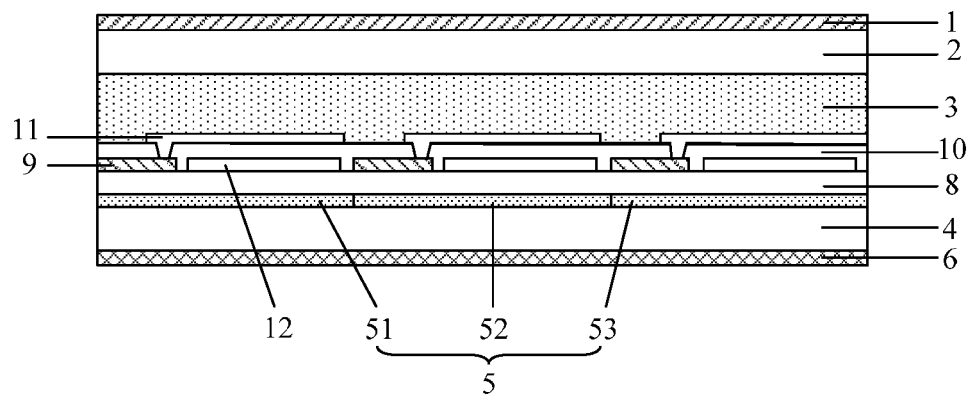
FIG. 11 is a seventh schematic diagram of the reflective type display device according to an embodiment of the present invention.

The third one, as shown in FIG. 11, the selective reflecting layer 5 is located on the second substrate 4; an insulating layer 8 is arranged on the selective reflecting layer 5; a thin film transistor 9, a common electrode 12, a passivation layer 10 and a pixel electrode 11 are arranged on the insulating layer 8; the pixel electrode 11 is connected with a drain of the thin film transistor 9 through a via hole on the passivation layer 10; the common electrode 12 and/or the pixel electrode 11 has slits.

Figure 12:
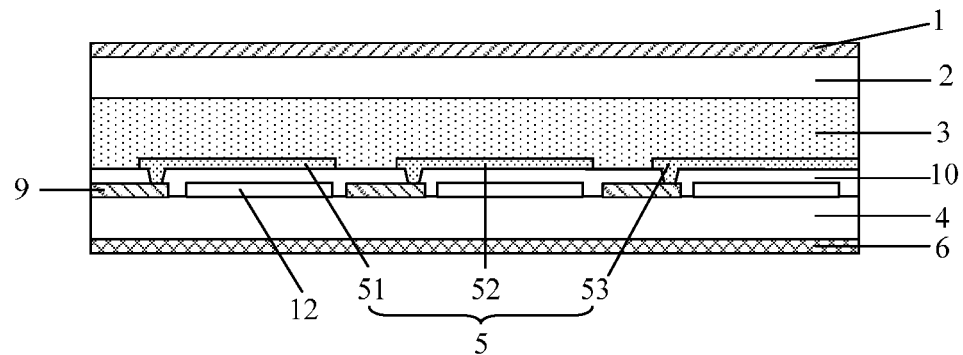
FIG. 12 is a eighth schematic diagram of the reflective type display device according to an embodiment of the present invention.

The fourth one, in the selective reflecting layer 5, the material for the first portion 51 is silver nanoparticle coated with silver coating; the material for the second portion 52 is titanium dioxide nanoparticle coated with silver coating; the material for the third portion 53 is silicon nanoparticle coated with silver coating; the selective reflecting layer 5 then is transparent and electrically conductive, thus the selective reflecting layer 5 can also serve as a pixel electrode. In such a situation, as shown in FIG. 12, a common electrode 12, a thin film transistor 9 and a passivation layer 10 are arranged on the second substrate 4; the selective reflecting layer 5 is located on the passivation layer 10; the selective reflecting layer 5 is connected with a drain of the thin film transistor 9 through a via hole on the passivation layer 10; the selective reflecting layer 5 and/or the common electrode 12 has slits.

Figure 13:
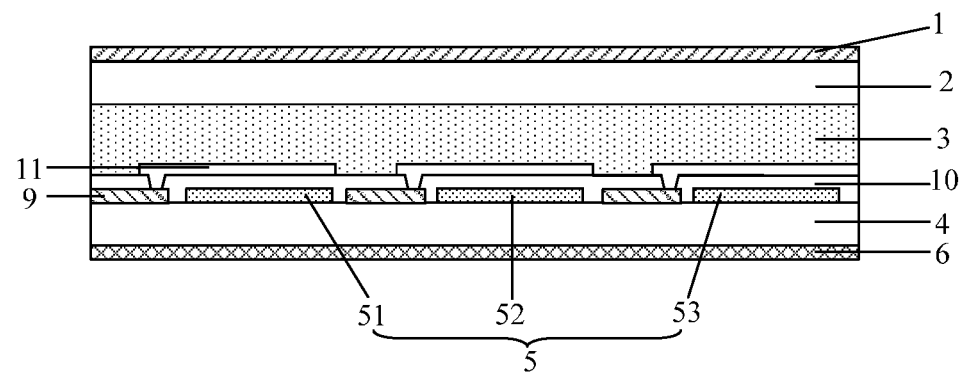
FIG. 13 is a ninth schematic diagram of the reflective type display device according to an embodiment of the present invention.

The fifth one, in the selective reflecting layer 5, the material for the first portion 51 is silver nanoparticle coated with silver coating; the material for the second portion 52 is titanium dioxide nanoparticle coated with silver coating; the material for the third portion 53 is silicon nanoparticle coated with silver coating; the selective reflecting layer 5 then is transparent and electrically conductive, thus the selective reflecting layer 5 can also serve as a pixel electrode. In such a situation, as shown in FIG. 13, a thin film transistor 9, a passivation layer 10 and a pixel electrode 11 are arranged on the second substrate 4; the pixel electrode 11 is connected with a drain of the thin film transistor 9 through a via hole on the passivation layer 10; the selective reflecting layer 5 and/or the pixel electrode 11 has slits.

A reflective type display device comprising the above-mentioned third, fourth or fifth structure operates in ADS display mode.

Based on the embodiments of the present invention, those skilled in the art can obtain specific structures of reflective type display devices operating in display modes such as VA, IPS, FFS and so on, which will not be illustrated one by one in the embodiments of the present invention.

The above embodiments are only used for explanations rather than limitations to the present invention, the ordinary skilled person in the related technical field, in the case of not departing from the spirit and scope of the present invention, may also make various modifications and variations, therefore, all the equivalent solutions also belong to the scope of the present invention, the patent protection scope of the present invention should be defined by the claims.

The invention claimed is:

1. A reflective type display device comprising:
   a polarizer;
   a transparent first substrate;
   a liquid crystal molecular layer;
   a second substrate; and
   a selective reflecting layer;
   wherein the polarizer, the transparent first substrate, the liquid crystal molecular layer, and the second substrate are arranged in sequence;
   wherein the selective reflecting layer is located between the liquid crystal molecular layer and the second substrate;
   wherein the selective reflecting layer reflects light with wavelength within a specific wavelength range;
   wherein the selective reflecting layer comprises: a first portion, wherein the first portion reflects light with wavelength within red wavelength range; a second portion, wherein the second portion reflects light with wavelength within green wavelength range; and a third portion, wherein the third portion reflects light with wavelength within blue wavelength range; and
   wherein the first portion of the selective reflecting layer, the second portion of the selective reflecting layer, and the third portion of the selective reflecting layer transmit light with wavelength within a wavelength range not reflected; and wherein the first portion of the selective reflecting layer, the second portion of the selective reflecting layer, and the third portion of the selective reflecting layer are electrically conductive.

2. The reflective type display device of claim 1 wherein the first portion of the selective reflecting layer is made of silver nanoparticle coated with silver coating;
   wherein the second portion of the selective reflecting layer is made of titanium dioxide nanoparticle coated with silver coating;
   wherein the third portion of the selective reflecting layer is made of silicon nanoparticle coated with silver coating.

3. The reflective type display device of claim 1 further comprising:
   a quarter-wave plate located between the polarizer and the first substrate;
   an insulating layer;
   a thin film transistor wherein the thin film transistor comprises a drain;
   a passivation layer; and
   a pixel electrode;
   wherein the insulating layer, the thin film transistor, the passivation layer, and the pixel electrode are arranged on the selective reflecting layer in sequence;
   wherein the selective reflecting layer is located on the second substrate;
   wherein the pixel electrode is connected with the drain of the thin film transistor through a via hole on the passivation layer.

4. The reflective type display device of claim 2 further comprising:
   a quarter-wave plate located between the polarizer and the first substrate;
   an insulating layer;
   a thin film transistor wherein the thin film transistor comprises a drain;
   a passivation layer; and
   a pixel electrode;
   wherein the insulating layer, the thin film transistor, the passivation layer, and the pixel electrode are arranged on the selective reflecting layer in sequence;
   wherein the selective reflecting layer is located on the second substrate;
   wherein the pixel electrode is connected with the drain of the thin film transistor through a via hole on the passivation layer.

5. The reflective type display device of claim 1 further comprising:
   a quarter-wave plate located between the polarizer and the first substrate;
   a thin film transistor wherein the thin film transistor comprises a drain; and
   a passivation layer:
   wherein the thin film layer and the passivation layer are arranged on the second substrate;
   wherein the selective reflecting layer is located on the passivation layer;
   wherein the selective reflecting layer is connected with the drain of the thin film transistor through a via on the passivation layer.

6. The reflective type display device of claim 1 further comprising:
   an insulating layer;
   a thin film transistor wherein the thin film transistor comprises a drain;
   a common electrode;
   a passivation layer; and
   a pixel electrode;
   wherein the elective reflecting layer is located on the second substrate;
   wherein the insulating layer is arranged on the selective reflecting layer;
   wherein the thin film transistor, the common electrode, the passivation layer, and the pixel electrode are arranged on the insulating layer;
   wherein the pixel electrode is connected with the drain of the thin film transistor through a via hole on the passivation layer;
   wherein at least one of the common electrode and the pixel electrode comprises slits.

7. The reflective type display device of claim 2 further comprising:
   an insulating layer;

a thin film transistor wherein the thin film transistor comprises a drain;
a common electrode;
a passivation layer; and
a pixel electrode;
wherein the elective reflecting layer is located on the second substrate;
wherein the insulating layer is arranged on the selective reflecting layer;
wherein the thin film transistor, the common electrode, the passivation layer, and the pixel electrode are arranged on the insulating layer;
wherein the pixel electrode is connected with the drain of the thin film transistor through a via hole on the passivation layer;
wherein at least one of the common electrode and the pixel electrode comprises slits.

8. The reflective type device of claim 1 further comprising:
a common electrode;
a thin film transistor wherein the thin film transistor comprises a drain; and
a passivation layer;
wherein the common electrode, the thin film transistor, and the passivation layer are arranged on the second substrate;
wherein the selective reflecting layer is located on the passivation layer;
wherein the selective reflecting layer is connected with the drain of the thin film transistor through a via hole on the passivation layer;
wherein at least one of the selective reflecting layer and the common electrode comprises slits.

9. The reflective type display device of claim 1 further comprising:
a thin film transistor wherein the thin film transistor comprises a drain;
a passivation layer; and
a pixel electrode;
wherein the thin film transistor, the passivation layer, and the pixel electrode are arranged on the second substrate;
wherein the pixel electrode is connected with the drain of the thin film transistor though a via hole on the passivation layer;
wherein at least one of the selective reflecting layer and the pixel electrode comprises slits.

10. The reflective type display device of claim 2 further comprising:
a thin film transistor wherein the thin film transistor comprises a drain;
a passivation layer; and
a pixel electrode;
wherein the thin film transistor, the passivation layer, and the pixel electrode are arranged on the second substrate;
wherein the pixel electrode is connected with the drain of the thin film transistor though a via hole on the passivation layer;
wherein at least one of the selective reflecting layer and the pixel electrode comprises slits.

11. The reflective type display device of claim 1 wherein a black matrix with a grid shape is arranged on a surface of the first substrate close to the liquid crystal molecular layer;
wherein the black matrix covers positions where the first portion of the selective reflecting layer, the second portion of the selective reflecting layer, and the third portion of the selective reflecting layer neighbor each other.

12. The reflective type display device of claim 1 wherein the second substrate is one of transparent or opaque;
wherein an absorption layer is arranged on a surface of the second substrate apart from the liquid crystal molecular layer when the second substrate is transparent to absorb light penetrating the selective reflecting layer and the second substrate.

* * * * *